Patented Aug. 2, 1949

2,478,114

UNITED STATES PATENT OFFICE 2,478,114

PROCESS OF PRODUCING CARBOXYLIC ACID ARYLIDES

Charles J. Lind, Buffalo, and Michael Witte, Eggertsville, N. Y., assignors to Allied Chemical & Dye Corporation, New York, N. Y., a corporation of New York No Drawing. Application February 18, 1947, Serial No. 729,394

11 Claims. (Cl. 260—562)

This invention relates to improvements in the process of producing carboxylic acid arylides (N-acylated arylamines) by reacting an aromatic amine having a replaceable N-hydrogen atom with a carboxylic acid or anhydride, whereby carboxylic acid arylides are obtained in a form relatively free from colored impurities and by-products.

The acylation of aromatic amines by heating an aromatic amine with a carboxylic acid or anhydride usually leads to a product which is discolored, presumably by colored impurities or by-products formed during the reaction. For example, the reaction of aniline with glacial acetic acid by heating under refluxing conditions produces a highly-colored grayish-purple acetanilide. For many commercial purposes, the discoloration is a disadvantage; as when such products are used as pharmaceutical agents or as dyestuff components. Hence, costly purification treatments with solvents and decolorizing materials have been employed to improve the color of such products.

According to the present invention, the production of carboxylic acid arylides by heating a reaction mixture containing an aromatic amine having a replaceable N-hydrogen atom and a carboxylic acid (or carboxylic acid anhydride or mixture thereof) is carried out under substantially anhydrous conditions with the inclusion in the reaction mixture of a small amount of a salt of an inorganic sulfur acid of lower oxidation stage than that of sulfuric acid. I have found that the inclusion of such a salt in the substantially anhydrous reaction mixture leads to arylide products relatively free from colored impurities.

The term "an inorganic sulfur acid of lower oxidation stage than that of sulfuric acid" as employed herein refers to those sulfur acids (cf. Hackh's Chemical Dictionary, third edition, 1944) wherein the valence of sulfur is less than 6.

Various salts of inorganic sulfur acids, and especially of inorganic oxygen acids of sulfur (i. e. sulfur acids which contain oxygen), of a lower oxidation stage than that of sulfuric acid may be employed, more particularly the light metal salts, and especially the alkali metal (including ammonium) and zinc salts, of hydrosulfurous acid, sulfoxylic acid, and stabilized aldehyde and ketone derivatives thereof. Examples of such salts are sodium sulfide, sodium hydrosulfite ($Na_2S_2O_4$), sodium formaldehyde sulfoxylate ($NaHSO_2.CH_2O.2H_2O$), commercial mixtures thereof, sodium bisulfite, potassium sulfite, zinc hydrosulfite, zinc formaldehyde sulfoxylate, and sodium metabisulfite. Hydrosulfites and aldehyde and ketone derivatives thereof are preferred.

Only a small amount of the sulfur acid salt is required to effect an inhibiting action upon the development of undesirable colored impurities and by-products, in accordance with the present invention. For example, in the production of acetanilide or o-acetotoluide by heating aniline or o-toluidine with glacial acetic acid under refluxing conditions, such small amounts as 0.5% to 1% of sodium hydrosulfite or sodium formaldehyde sulfoxylate, based on the weight of the aniline or toluidine employed, are effective to inhibit discoloration of the arylide product almost completely; so that a substantially white product can be obtained without requiring costly and tedious purification. Greater amounts than are required to inhibit discoloration of the arylide product may be employed, but the amount should not be so great that substantial reaction takes place between the aromatic amine and the sulfur acid salt. Thus, in the case of sodium hydrosulfite, amounts thereof sufficient to form substantial quantities of arylamine sulfonic acids, by reaction between the aromatic amine and sodium hydrosulfite, are preferably avoided. In general, an amount of sulfur acid salt is employed ranging from 0.1% to about 10%, and preferably from about 0.5% to about 2%, based on the weight of the aromatic amine. The particular amount of sulfur acid salt used in a particular case will vary, depending upon the specific reaction conditions and the relative effectiveness of the individual salt. For example, a somewhat greater amount of sodium bisulfite than sodium hydrosulfite is preferably employed, owing to the superior effectiveness of sodium hydrosulfite.

Aside from the addition of the sulfur acid salt to the reaction mixture, the reaction between the aromatic amine and the acylating agent is carried out under anhydrous reaction conditions in the usual manner. This may include carrying out the reaction between the acylating agent and arylamine in substantially anhydrous form (e. g., in commercial water-free form) in the presence or absence of organic solvents, and in the presence or absence of acid-binding agents (e. g. soda ash, sodium acetate, etc.). Substantially anhydrous conditions can be obtained by heating the reaction mixture to a sufficiently high temperature to vaporize water formed in the reaction.

Various aromatic amines having a replaceable N-hydrogen atom may be employed; for example, aniline, o-toluidine, p-toluidine, the chloroanilines, the anisidines, the phenetidines, the chloro-toluidines, alpha- and beta-naphthylamine, benzidine, etc. Further, various carboxylic acids and anhydrides may be employed; for example, acetic acid, propionic acid, stearic acid, acetic anhydride, benzoic anhydride, terephthalic acid, 2-hydroxy-3-naphthoic acid, etc. The present invention is particularly effective for inhibiting the formation of colored impurities and by-products in processes wherein an aliphatic carboxylic acid, and particularly an aliphatic monocarboxylic acid (with or without the corresponding anhydride, which may be added to increase the speed of the reaction), is heated with a mononuclear aromatic amine and especially a mononuclear primary aromatic amine, to form the corresponding arylide.

The invention will be illustrated by the following specific examples. The parts are by weight and the temperatures are in degrees centigrade.

Example 1

Part A.—450 parts of rectified aniline, 293 parts of glacial acetic acid and 2.2 parts of sodium hydrosulfite ($Na_2S_2O_4$) were charged to a glass still provided with an agitator and an efficient packed column (equivalent to 15 theoretical plates). The agitated mixture was heated to boiling (110° to 120°), and refluxed over a period of 25 to 30 hours, while drawing off water vapor generated by the reaction, together with small amounts of acetic acid and aniline vapors, from the top of the column. The temperature of the reaction mass rose fairly uniformly to a maximum of 200° near the end of the refluxing period. The mass was then distilled at a pressure of approximately 130 millimeters of mercury (abs.) until the boiling point rose to 170° at said pressure. The distillate, containing residual acetic acid and aniline and a very small amount of water, was collected separately for reuse. The residue was removed from the still and on cooling yielded substantially white acetanilide having a melting point of 114° (uncorrected).

Part B.—The procedure of part A of this example was repeated, but the sodium hydrosulfite was omitted. A somewhat lower yield of highly-colored grayish-purple acetanilide was obtained.

Example 2

725 parts of rectified aniline, 470 parts of glacial acetic acid and 19.5 parts of dehydrated sodium sulfide (obtained by fusing crystallized sodium sulfide in a porcelain crucible over a flame until no condensable moisture was given off) were heated and refluxed in the manner described in Example 1, and the resulting acetanilide was recovered in the same manner. It was a pale tannish-white powder, slightly darker than the product of Example 1, part A, having a melting point of 114° (uncorrected).

Example 3

Part A.—428 parts of rectified ortho-toluidine (2-amino-toluene), 242 parts of glacial acetic acid and 2 parts of sodium hydrosulfite were heated and refluxed in the manner described in Example 1, and the resulting o-acetotoluide was recovered in the same manner. It was substantially white in color, and had a setting point of 107° (uncorrected).

Part B.—The procedure of part A of this example was repeated, but the sodium hydrosulfite was omitted. A highly-colored purplish o-acetotoluide was obtained.

Example 4

Part A.—200 parts of rectified aniline, 150 parts of glacial acetic acid and 1 part of sodium hydrosulfite were charged to a glass reactor provided with a thermometer, agitator and a water-cooled reflux condenser. The mixture was heated to about 120° and maintained at that temperature for 6 to 8 hours; then it was gradually heated to 200° over a period of 22 to 24 hours to complete the reaction, during which time most of the water formed by the reaction was distilled into the atmosphere together with some acetic acid. The resulting reaction mass was then "stripped" of its content of residual aniline, acetic acid and water by heating without reflux at a pressure of 130 mm. of mercury (abs.) until the temperature reached 160°. The still residue was removed, cooled, and ground to a powder. The resulting acetanilide was a pale tannish-white powder melting at 113° to 113.5° (uncorrected).

Part B.—When the procedure of part A of this example was repeated, but omitting the sodium hydrosulfite, the resulting acetanilide was highly-colored grayish-purple.

Example 5

One part of sodium formaldehyde sulfoxylate ($NaHSO_2CH_2O.2H_2O$) was substituted for the sodium hydrosulfite employed in Example 4, part A. The yield, color and melting point of the resulting acetanilide was substantially identical with those of the product of Example 4, part A.

Example 6

By employing one part of sodium bisulfite ($NaHSO_3$) in place of the sodium hydrosulfite employed in Example 4, part A, a somewhat more colored acetanilide was obtained which was less colored than the product of Example 4, part B.

In proceeding according to the foregoing Examples 1 to 6, the final acetanilide and o-acetotoluide products contain small amounts of sodium hydrosulfite, sodium formaldehyde sulfoxylate, sodium sulfide, or sodium bisulfite; since said salts do not dissolve appreciably in the reaction mass. These and other sulfur acid salts may be removed, if desired, by treating the arylide with water, whereby the sulfur acid salt is dissolved, and the relatively poorly-soluble amide is recovered in essentially pure form. Thus, for example, the powdered arylide product of Examples 1 to 6 may be slurried in say 10 to 20 times its weight of warm water, cooled and filtered; or the still residue obtained by "stripping" residual amine, acetic acid and water from the reaction mass by vacuum distillation may be poured directly into a body of agitated water whereby the sulfur acid salt is dissolved and the amide precipitated. If desired, the reaction mass itself may be discharged into a body of acidified water, to dissolve unreacted amine (as a soluble acid salt) together with the sulfur acid salt and excess acetic acid, leaving the insoluble amide which may be recovered by filtration or other separation method. Further, the undissolved sulfur acid salt may be mechanically separated from the molten arylide; as by filtration, or by settling and withdrawing a small portion of the molten arylide containing the deposited salt. The latter method is particularly useful for separating sulfur acid salts which are difficultly soluble in water.

Ordinarily, the sulfur acid salts may be left in the arylide products when the salts are used in the small amounts employed in the foregoing examples.

It will be evident to those skilled in the art that the invention is not limited to the details of the foregoing examples and that changes may be made without departing from the scope of the invention. Accordingly, the above descrip-

We claim:

1. In the process of producing a carboxylic acid arylide by heating a reaction mixture containing an aromatic amine having a replaceable N-hydrogen atom and an acylating agent selected from the group consisting of carboxylic acids and carboxylic acid anhydrides, the improvement which comprises carrying out the reaction under substantially anhydrous reaction conditions with the inclusion in the reaction mixture of a small amount of a salt selected from the group consisting of light metal and zinc salts of an inorganic sulfur acid of a lower oxidation stage than that of sulfuric acid, whereby discoloration of the resulting arylide product is inhibited.

2. In the process of producing a carboxylic acid arylide by heating a reaction mixture containing an aromatic amine having a replaceable N-hydrogen atom and an acylating agent selected from the group consisting of carboxylic acids and carboxylic acid anhydrides, the improvement which comprises carrying out the reaction under substantially anhydrous reaction conditions with the inclusion in the reaction mixture of a small amount of a salt selected from the group consisting of light metal and zinc salts of an inorganic oxygen acid of sulfur of a lower oxidation stage than that of sulfuric acid, whereby discoloration of the resulting arylide product is inhibited.

3. The process of producing a carboxylic acid arylide which comprises forming a mixture containing a mononuclear primary aromatic amine, an acylating agent selected from the group consisting of carboxylic acids and carboxylic acid anhydrides, and a small amount of a salt selected from the group consisting of light metal and zinc salts of an inorganic sulfur acid of a lower oxidation stage than that of sulfuric acid, and heating the mixture under substantially anhydrous reaction conditions, whereby discoloration of the resulting arylide product is inhibited.

4. The process of producing a carboxylic acid arylide which comprises forming a mixture containing an aromatic amine having a replaceable N-hydrogen atom, an acylating agent selected from the group consisting of carboxylic acids and carboxylic acid anhydrides, and 0.1% to 10%, based on the weight of the aromatic amine, of a light metal salt of an inorganic sulfur acid of a lower oxidation stage than that of sulfuric acid, and heating the mixture under substantially anhydrous reaction conditions, whereby discoloration of the resulting arylide product is inhibited.

5. The process of producing a carboxylic acid arylide which comprises forming a mixture containing an aromatic amine having a replaceable N-hydrogen atom, an acylating agent selected from the group consisting of carboxylic acids and carboxylic acid anhydrides, and 0.1% to 10%, based on the weight of the aromatic amine, of a light metal salt of an inorganic oxygen acid of sulfur of a lower oxidation stage than that of sulfuric acid, heating the mixture to boiling and continuing the heating under refluxing conditions, while removing water formed in the reaction, whereby discoloration of the resulting arylide product is inhibited.

6. In the process of producing a carboxylic acid arylide by heating a reaction mixture containing an aromatic amine having a replaceable N-hydrogen atom and an acylating agent selected from the group consisting of carboxylic acids and carboxylic acid anhydrides, the improvement which comprises carrying out the reaction under substantially anhydrous reaction conditions with the inclusion in the reaction mixture of 0.5% to 10% of a hydrosulfite selected from the group consisting of light metal and zinc hydrosulfites, based on the weight of the aromatic amine, whereby discoloration of the resulting arylide product is inhibited.

7. The process of producing a carboxylic acid arylide which comprises forming a mixture containing a mononuclear aromatic amine having a replaceable N-hydrogen atom, an aliphatic carboxylic acid, and 0.1% to 10%, based on the weight of the aromatic amine, of a salt selected from the group consisting of light metal and zinc salts of an inorganic oxygen acid of sulfur of a lower oxidation stage than that of sulfuric acid, heating the mixture to boiling and continuing the heating under refluxing conditions, while removing water formed in the reaction, whereby discoloration of the resulting arylide product is inhibited.

8. The process of producing a carboxylic acid arylide which comprises forming a mixture containing a mononuclear primary aromatic amine, an aliphatic monocarboxylic acid, and 0.1% to 10%, based on the weight of the aromatic amine, of an alkali metal salt of an inorganic oxygen acid of sulfur of a lower oxidation stage than that of sulfuric acid, heating the mixture to boiling and continuing the boiling under refluxing conditions, while removing water formed in the reaction, whereby discoloration of the resulting arylide product is inhibited.

9. The process of producing a carboxylic acid arylide which comprises forming a mixture containing a mononuclear primary aromatic amine, an aliphatic monocarboxylic acid, and 0.5% to 2%, based on the weight of the aromatic amine, of a light metal hydrosulfite, heating the mixture to boiling and continuing the boiling under refluxing conditions, while removing water formed in the reaction, whereby discoloration of the resulting arylide product is inhibited.

10. The process of producing acetanilide which comprises forming a mixture containing aniline, glacial acetic acid and 0.5% to 10%, based on the weight of the aniline, of sodium hydrosulfite, heating the mixture to boiling and continuing the boiling under refluxing conditions, while removing water formed in the reaction, whereby discoloration of the resulting acetanilide is inhibited.

11. The process of producing o-acetotoluide which comprises forming a mixture containing o-toluidine, glacial acetic acid, and 0.5% to 10%, based on the weight of the o-toluidine, of sodium hydrosulfite, heating the mixture to boiling and continuing the boiling under refluxing conditions, while removing water formed in the reaction, whereby discoloration of the resulting o-acetotoluide is inhibited.

CHARLES J. LIND.
MICHAEL WITTE.

REFERENCES CITED

The following references are of record in the file of this patent:

UNITED STATES PATENTS

| Number | Name | Date |
| --- | --- | --- |
| 1,878,243 | Laska | Sept. 20, 1932 |
| 1,878,969 | Mills | Sept. 20, 1932 |
| 2,022,579 | Turski | Nov. 26, 1935 |